United States Patent
He et al.

(10) Patent No.: US 12,464,203 B2
(45) Date of Patent: Nov. 4, 2025

(54) IMPLEMENTING VIDEO SEGMENTATION

(71) Applicant: Lemon Inc., Grand Cayman (KY)

(72) Inventors: Ju He, Los Angeles, CA (US); Qihang Yu, Los Angeles, CA (US); Inkyu Shin, Los Angeles, CA (US); Xueqing Deng, Los Angeles, CA (US); Xiaohui Shen, Los Angeles, CA (US); Liang-Chieh Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 137 days.

(21) Appl. No.: 18/395,356

(22) Filed: Dec. 22, 2023

(65) Prior Publication Data

US 2025/0113087 A1  Apr. 3, 2025

Related U.S. Application Data

(60) Provisional application No. 63/540,992, filed on Sep. 28, 2023.

(51) Int. Cl.
*H04N 21/845* (2011.01)
*H04N 21/44* (2011.01)

(52) U.S. Cl.
CPC ... *H04N 21/8456* (2013.01); *H04N 21/44008* (2013.01)

(58) Field of Classification Search
CPC ............. H04N 21/8456; H04N 21/44008
See application file for complete search history.

(56) References Cited

U.S. PATENT DOCUMENTS

| | | | |
|---|---|---|---|
| 2016/0080830 A1* | 3/2016 | Kim | H04N 21/2665 725/19 |
| 2018/0137363 A1* | 5/2018 | Campagnoli | G06V 20/42 |
| 2019/0289372 A1* | 9/2019 | Merler | G06V 20/46 |
| 2021/0142148 A1* | 5/2021 | Wang | G06F 18/2415 |
| 2023/0267737 A1* | 8/2023 | Green | G06V 20/42 382/103 |

OTHER PUBLICATIONS

Anurag et al.; "ViViT: A Video Vision Transformer"; IEEE/CVF Int'l Conf. on Computer Vision; 2021; p. 6836-6846.

Athar et al.; "STEm-Seg: Spatio-Temporal Embeddings for Instance Segmentation in Videos"; European Conf. on Computer Vision; 2020; 27 pages.

(Continued)

*Primary Examiner* — Sunghyoun Park
(74) *Attorney, Agent, or Firm* — BakerHostetler

(57) ABSTRACT

The present disclosure describes techniques for implementing video segmentation. A video is divided into a plurality of clips. Each of the plurality of clips comprises several frames. Axial-trajectory attention is applied to each of the plurality of clips by a first sub-model. Clip features corresponding to each of the plurality of clips are generated by the first sub-model. A set of object queries corresponding to each of the plurality of clips is generated based on the clip features by a transformer decoder. Trajectory attention is applied to refine sets of object queries corresponding to the plurality of clips by a second sub-model. Video-level segmentation results are generated based on the refined object queries.

20 Claims, 14 Drawing Sheets

(56) References Cited

OTHER PUBLICATIONS

Athar et al.; "TarViS: A Unified Approach for Target-Based Video Segmentation"; Int'l Conf. on Computer Vision; 2023; p. 18738-18748.
Bertasius et al.; "Is Space-Time Attention All You Need for Video Understanding?"; Int'l Conf. on Machine Learning; 2021; 3 pages.
Carion et al.; "End-to-End Object Detection with Transformers"; European Conf. on Computer Vision; 2020; p. 213-229.
Chen et al.; "Semantic Image Segmentation with Deep Convolutional Nets and Fully Connected CRFs"; ICLR; 2015; 14 pages.
Chen et al.; "DeepLab: Semantic Image Segmentation with Deep Convolutional Nets, Atrous Convolution, and Fully Connected CRFs"; IEEE Transactions on Pattern Analysis and Machine Intelligence; vol. 40; 2017; 14 pages.
Cheng et al.; "Masked-Attention Mask Transformer for Universal Image Segmentation"; IEEE/CVF Int'l Conf. on Computer Vision and Pattern Recognition; 2022; p. 1290-1299.
Cordts et al.; "The Cityscapes Dataset for Semantic Urban Scene Understanding"; IEEE Conf. on Computer Vision and Pattern Recognition; 2016; p. 3213-3223.
Fan et al.; "Multiscale Vision Transformers"; IEEE/CVF Int'l Conf. on Computer Vision; 2021; p. 6824-6835.
Fu et. al.; "CompFeat: Comprehensive Feature Aggregation for Video Instance Segmentation"; $35^{th}$ AAAI Conf. on Artificial Intelligence; 2021; p. 1361-1369.
Geiger et al.; "Vision Meets robotics: the KITTI dataset"; The Int'l Journal of Robotics Research; vol. 32; 2013; p. 1231-1237.
He et al.; "Deep Residual Learning for Image Recognition"; IEEE Conf. on Computer Vision and Pattern Recognition; 2016; p. 770-778.
Heo et al.; "VITA: Video Instance Segmentation via Object Token Association"; $36^{th}$ Conf. on Neural Information Processing Systems; 2022; 12 pages.
Heo et al.; "A Generalized Framework for Video Instance Segmentation"; IEEE/CVF Conf. on Computer Vision and Pattern Recognition; 2023; p. 14623-14632.
Ho et al.; "Axial Attention in Multidimensional Transformers"; Computer Vision and Pattern Recognition; arXiv:1912.12180; Dec. 2019; 11 pages.
Huang et al.; "MinVIS: A Minimal Video Instance Segmentation Framework without Video-based Training"; $36^{th}$ Conf. on Neural Information Processing Systems; 2022; 13 pages.
Huang et al.; "CCNet: Criss-Cross Attention for Semantic Segmentation"; IEEE/CVF Int'l Conf. on Computer Vision; 2019; p. 603-612.
Hwang et al.; "Video Instance Segmentation using Inter-Frame Communication Transformers"; $35^{th}$ Conf. on Neural Information Processing Systems; 2021; 12 pages.
Ke et al.; "Prototypical Cross-Attention Networks for Multiple Object Tracking and Segmentation"; $35^{th}$ Conf. on Neural Information Processing Systems; 2021; 12 pages.
Kim et al.; "Video Panoptic Segmentation"; IEEE/CVF Conf. on Computer Vision and Pattern Recognition; 2020; p. 9859-9868.
Kim et al.; "TubeFormer-DeepLab: Video Mask Transformer"; IEEE/CVF Conf. on Computer Vision and Pattern Recognition; 2022; p. 13914-13924.
Kuhn; "The Hungarian method for the assignment problem"; Naval Research Logistics Quarterly; vol. 2; 1955; (Abstract Only).
Li et al.; "TCOVIS: Temporally Consistent Online Video Instance Segmentation"; IEEE/CVF Int'l Conf. on Computer Vision; 2023; p. 1097-1107.
Li et al.; "Video K-Net: A Simple, Strong, and Unified Baseline for Video Segmentation"; IEEE/CVF Conf. on Computer Vision and Pattern Recognition; 2022; p. 18847-18857.
Li et al.; "Tube-Link: A Flexible Cross Tube Framework for Universal Video Segmentation"; IEEE/CVF Int'l Conf. on Computer Vision; 2023; p. 13923-13933.
Lin et al.; "Video Instance Segmentation With a Propose-Reduce Paradigm"; IEEE/CVF Int'l Conf. on Computer Vision; 2021; p. 1739-1748.
Lin et al.; "Microsoft COCO: Common Objects in Context"; European Conf. on Computer Vision; 2014; p. 740-755.
Liu et al.; "InstMove: Instance Motion for Object-Centric Video Segmentation"; IEEE/CVF Conf. on Computer Vision and Pattern Recognition; 2023; p. 6344-6354.
Liu et al.; "Swin Transformer: Hierarchical Vision Transformer Using Shifted Windows"; IEEE/CVF Int'l Conf. on Computer Vision; 2021; p. 10012-10022.
Liu et al.; "Video Swin Transformer"; IEEE/CVF Conf. on Computer Vision and Pattern Recognition; 2022; p. 3202-3211.
Liu et al.; "A ConvNet for the 2020s"; IEEE/CVF Conf. on Computer Vision and Pattern Recognition; 2022; p. 11976-11986.
Miao et al.; "Large-Scale Video Panoptic Segmentation in the Wild: A Benchmark"; IEEE/CVF Conf. on Computer Vision and Pattern Recognition; 2022; p. 21033-21043.
Niemark et al.; "Video Transformer Network"; IEEE/CVF Int'l Conf. on Computer Vision Workshops; 2021; p. 3163-3172.
Patrick et al.; "Keeping Your Eye on the Ball: Trajectory Attention in Video Transformers"; $35^{th}$ Conf. on Neural Information Processing Systems; 2021; 14 pages.
Qi et al.; "Occluded Video Instance Segmentation: A Benchmark"; Int'l Journal of Computer Vision; vol. 130; 2022; p. 2022-2039.
Qiao et al.; "VIP-DeepLab: Learning Visual Perception With Depth-Aware Video Panoptic Segmentation"; IEEE/CVF Conf. on Computer Vision and Pattern Recognition; 2021; p. 3997-4008.
Russakovsky et al.; "ImageNet Large Scale Visual Recognition Challenge"; Int'l Journal of Computer Vision; vol. 115; 2015; 43 pages.
Shin et al.; "Video-kMaX: A Simple Unified Approach for Online and Near-Online Video Panoptic Segmentation"; IEEE/CVF Winter Conf. on Applications of Computer Vision; 2024; p. 229-239.
Vaswani et al.; "Attention is All you Need"; $31^{st}$ Conf. on Neural Information Processing Systems; 2017; 11 pages.
Voigtlaender et al.; "MOTS: Multi-Object Tracking and Segmentation"; IEEE/CVF Conf. on Computer Vision and Pattern Recognition; 2019; p. 7942-7951.
Wang et al.; "Axial-DeepLab: Stand-Alone Axial-Attention for Panoptic Segmentation"; European Conf. on Computer Vision; 2020; 26 pages.
Wang et al.; "Max-DeepLab: End-to-End Panoptic Segmentation With Mask Transformers"; IEEE/CVF Conf. on Computer Vision and Pattern Recognition; 2021; p. 5463-5474.
Wang et al.; "Deformable Video Transformer"; IEEE/CVF Conf. on Computer Vision and Pattern Recognition; 2022; p. 14053-14062.
Wang et al.; "End-to-End Video Instance Segmentation With Transformers"; IEEE/CVF Conf. on Computer Vision and Pattern Recognition; 2021; p. 8741-8750.
Weber et al.; "STEP: Segmenting and Tracking Every Pixel"; $35^{th}$ Conf. on Neural Information Processing Systems; 2021; 21 pages.
Woo et al.; "Learning To Associate Every Segment for Video Panoptic Segmentation"; IEEE/CVF Conf. on Computer Vision and Pattern Recognition; 2021; p. 2705-2714.
Woo et al.; "ConvNext V2: Co-designing and Scaling ConvNets with Masked Autoencoders"; IEEE/CVF Conf. on Computer Vision and Pattern Recognition; 2023; p. 16133-16142.
Wu et al.; "Efficient Video Instance Segmentation via Tracklet Query and Proposal"; IEEE/CVF Conf. on Computer Vision and Pattern Recognition; 2022; p. 959-968.
Wu et al.; "SeqFormer: Sequential Transformer for Video Instance Segmentation"; European Conf. on Computer Vision; 2022; 21 pages.
Yang et al.; "Video Instance Segmentation"; IEEE/CVF Int'l Conf. on Computer Vision; 2019; p. 5188-5197.
Wu et al.; "In Defense of Online Models for Video Instance Segmentation"; European Conf. on Computer Vision; 2022; 23 pages.
Yang et al.; "The 3rd Large-scale Video Object Segmentation Challenge—Track 1: Video Object Segmentation"; YouTube VOS; 2021; 2 pages.

(56) References Cited

OTHER PUBLICATIONS

Yang et al.; "The 4th Large-scale Video Object Segmentation—Track 3: Referring Video Object Segmentation"; YouTube VOS; 2022; 2 pages.
Yang et al.; "Crossover Learning for Fast Online Video Instance Segmentation"; IEEE/CVF Int'l Conf. on Computer Vision; 2021; p. 8043-8052.
Ying et al.; "CTVIS: Consistent Training for Online Video Instance Segmentation"; IEE/CVF Int'l Conf. on Computer Vision; 2023; p. 899-908.
Yu et al.; "k-means Mask Transformer"; European Conf. on Computer Vision; 2022; 20 pages.
Zhang et al.; "DVIS: Decoupled Video Instance Segmentation Framework"; IEEE/CVF Int'l Conf. on Computer Vision; 2023; p. 1282-1291.
Zhu et al.; "Deformable DETR: Deformable Transformers for End-to-End Object Detection"; ICLR; 2021; 16 pages.

* cited by examiner

700

Generate a sequence of pixel features along a width-axis based on extracting features from each frame in the same clip 702

Perform axial-trajectory attention along the width-axis 704

800

```
┌─────────────────────────────────────────────────────────────────────┐
│  Divide a video into a plurality of clips, wherein each of the      │
│  plurality of clips comprises several frames 802                    │
└─────────────────────────────────────────────────────────────────────┘
                                  │
                                  ▼
┌─────────────────────────────────────────────────────────────────────┐
│  Perform multi-scale deformable attention on feature maps extracted │
│  from frames in a same clip among the plurality of clips to         │
│  exchange information across feature map scales and to ensure       │
│  spatial consistency of clip features 804                           │
└─────────────────────────────────────────────────────────────────────┘
                                  │
                                  ▼
┌─────────────────────────────────────────────────────────────────────┐
│  Apply axial-trajectory attention to each of the plurality of clips │
│  along height-axis and width-axis 806                               │
└─────────────────────────────────────────────────────────────────────┘
```

FIG. 8

| #MSDeformAttn | #TrjAttn | #AxialTrjAttn | $N_w$ | VPQ |
|---|---|---|---|---|
| 1 | | | 2 | 45.3 |
| 1 | | 1 | 2 | 45.4 |
| 1 | | 2 | 2 | 46.1 |
| 1 | 1 | | 1 | ?? |
| 1 | | 2 | 3 | 45.2 |
| 1 | | 3 | 2 | 45.7 |
| 2 | | 4 | 1 | 45.8 |

IMPLEMENTING VIDEO SEGMENTATION

CROSS-REFERENCE TO RELATED APPLICATION

This disclosure claims priority of U.S. Provisional Patent Application No. 63/540,992 filed on Sep. 28, 2023, which is incorporated herein by reference in its entirety.

BACKGROUND

Computer vision is increasingly being used across a variety of industries to perform different tasks. The most pioneering work in the field of computer vision have mostly tackled image processing. The video processing field has been less deeply explored due to complexity of video data and high computational cost. Improved techniques for video segmentation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 shows an example process for implementing video segmentation in accordance with the present disclosure.

FIG. 13 shows example evaluation results in accordance with the present disclosure.

DETAILED DESCRIPTION OF ILLUSTRATIVE EMBODIMENTS

Video panoptic segmentation is a challenging computer vision task that requires a temporally consistent pixel-level scene understanding of a video. Such temporally consistent pixel-level scene understanding may be gained by jointly segmenting objects of various classes e.g., "things" (person, car, etc.) and "stuff" (sky, grass, etc.), and associating them (i.e., tracking them, across all frames in the video. Video segmentation can benefit a wide range of downstream applications, such as autonomous driving, robot visual control, and video editing.

Existing video segmentation techniques have unified different video segmentation tasks as a simple set prediction task, where the input video is segmented into a set of tubes (a tube is obtained by linking segmentation masks along the time axis) to match the ground-truth tubes. Concretely, given an input video $V \in \mathbb{R}^{L \times 3 \times H \times W}$ with L represents the video length and H, W represent the frame height and width, video segmentation aims at segmenting it into a set of N class-labeled tubes:

$$\{\hat{y}_i\} = \{(\hat{m}_i, \hat{p}_i(c))\}_{i=1}^{N}, \quad (1)$$

where $\hat{m}_i \in [0,1]^{L \times H \times W}$ and $\hat{p}_i(c)$ represent the predicted tube and its corresponding semantic class probability. The ground-truth set containing M class-labeled tubes is similarly represented as $\{y_i\} = \{(m_i, p_i(c))\}_{i=1}^{M}$. These two sets are matched through Hungarian Matching (Kuhn, M 1955) during training to compute the losses.

The above video segmentation formulation is theoretically applicable to any length L of video sequences. However, it is infeasible to fit an entire whole video into modern large network backbones during training. Thus, most works exploit frame-level segmenter or clip-level segmenters (a clip is a short video sequence typically of two or three frames) to get frame-level or clip-level tubes first and further associate them to obtain the final video-level tubes. The existing techniques overlook the potential of improving within-clip tracking as well as the long-term consistent tracking beyond neighboring clips. Described herein are improved techniques for video segmentation.

Figure 1:
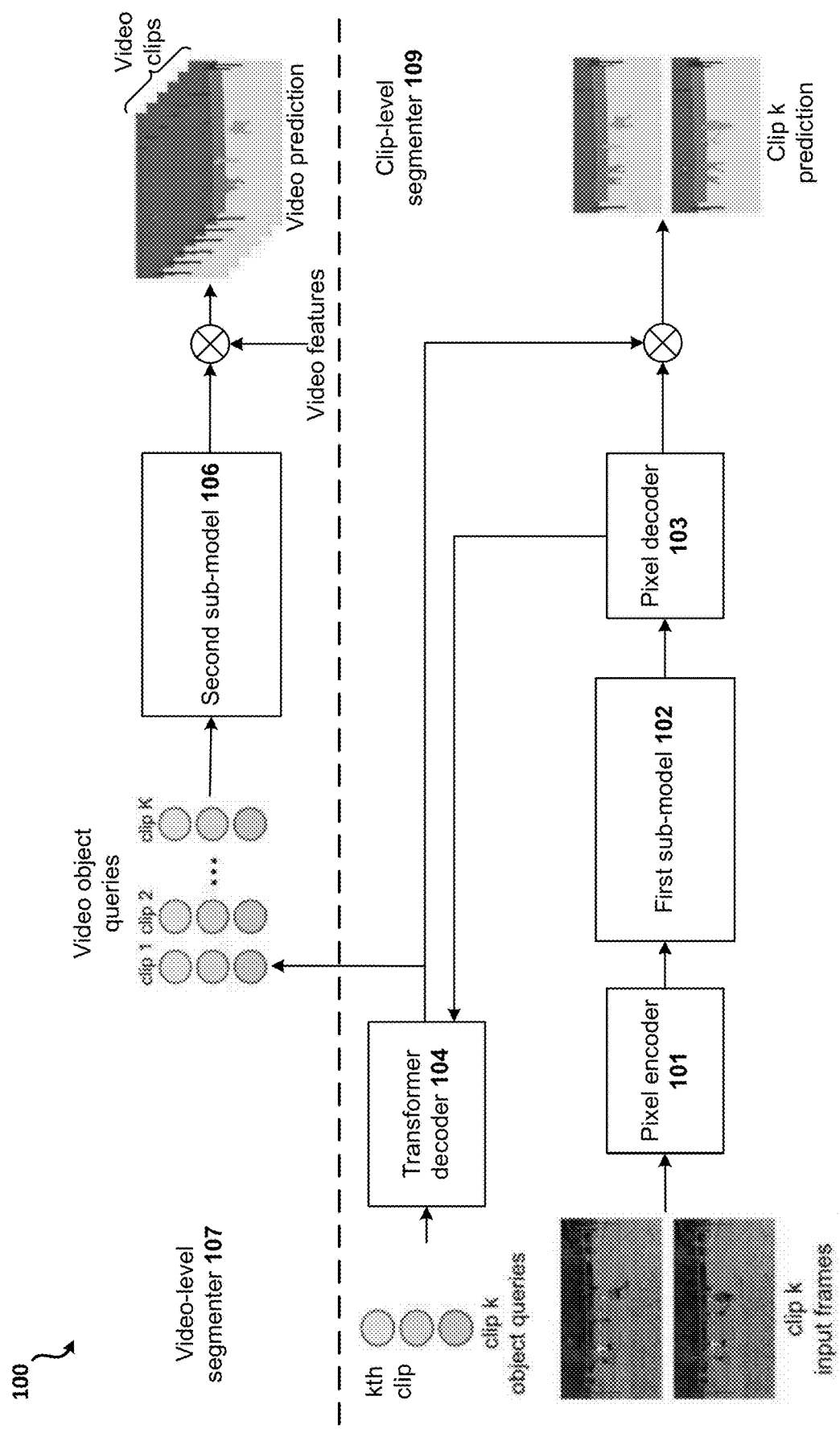
FIG. 1 shows an example system for implementing video segmentation in accordance with the present disclosure.

FIG. 1 shows an example system 100 for implementing video segmentation by using a within-clip tracking sub-model and a cross-clip tracking sub-model. A video may be divided into a plurality of clips. Each of the plurality of clips comprises several frames of the video. Formally, the whole video V may be split into a set of non-overlapping clips: $v_i \in \mathbb{R}^{T \times 3 \times H \times W}$ where T represents the length of each clip in temporal dimension (assuming that L is divisible by T for simplicity; if not, the last frame may be duplicated). T may be greater than or equal to two. The system 100 comprises a clip-level segmenter 109 and a video-level segmenter 107.

The clip-level segmenter 109 may comprise a pixel encoder 101, a first sub-model 102 (e.g., within-clip tracking sub-model), a pixel decoder 103, and a transformer decoder 104. The first sub-model 102 may be configured to track objects across frames within a same clip among the plurality of clips. Each of the plurality of clips may be input into the pixel encoder 101. The pixel encoder 101 may generate clip features for each of the plurality of clips. The clip features may be input into the first sub-model 102. The first sub-model 102 may apply axial-trajectory attention and multi-scale deformable attention for enhancing the local consistency within neighboring frames of a same clip. The pixel decoder 103 may output clip features (e.g., spatial-temporal enhanced features) for each of the plurality of clips. The pixel decoder 103 may generate the clip features (e.g., spatial-temporal enhanced features) corresponding to each of the plurality of clips based on the output of the first sub-model 102.

The transformer decoder 104 may generate a set of object queries corresponding to each of the plurality of clips. The transformer decoder 104 may generate the set of object queries corresponding to each of the plurality of clips based on the clip features generated by the pixel decoder 103. The transformer decoder 104 may be a k-means transformer decoder configured to produce a clip-level prediction, where object queries $C_k \in \mathbb{R}^{N \times D}$ (for k-th clip) are iteratively refined over multiple layers of the transformer decoder 104. The resulting object queries may be used to generate a set of N class-labeled tubes.

In embodiments, the trajectory attention of the first sub-model 102 learns to model the temporal correspondences between neighboring frames of a same clip by estimating the motion paths along the time-axis and aggregating information along the trajectories. However, it is nontrivial to directly extend trajectory attention to per-pixel dense prediction tasks due to its quadratic dependency on input size. To tackle this challenge, the first sub-model 102 applies axial-trajectory attention for effectively computing the trajectory attention sequentially along the height- and width-axes.

In embodiments, the first sub-model 102 (e.g., within-clip tracking sub-model) may be enhanced by incorporating multi-scale deformable attention, which may be stacked iteratively with the axial-trajectory attention to ensure that the learned clip features are both temporally and spatially consistent. Afterwards, the transformer decoder 104 may be applied to obtain clip-level predictions, where object queries are learned to encode the objects in each clip (i.e., each query is responsible of predicting an object's mask and semantic class in the clip). At this stage, a clip-level segmenter enhanced with the first sub-model 102 (e.g., within-clip tracking sub-model) may be able to capture motion information within each clip, achieving consistent predictions in a near-online manner.

The video-level segmenter 107 may comprise a second sub-model 106 (e.g., cross-clip tracking sub-model). The second sub-model 106 may be configured to track each object across the plurality of clips. The second sub-model 106 may improve long-term consistency using trajectory attention along with temporal atrous spatial pyramid pooling (Temporal-ASPP). The second sub-model 106 may apply trajectory attention to refine sets of object queries corresponding to the plurality of clips. The video-level segmenter 107 may generate video-level segmentation results based on the refined object queries. For example, the video-level segmenter 107 may obtain video features by concatenating all clip features output by the pixel decoder 103 (totally K clips) and generate a video prediction by multiplying ( ) the video features and the refined clip object queries.

The second sub-model 106 may take all the clip-level object queries as input. Specifically, each clip may be processed by its own set of object queries. Given a video partitioned into several clips, several sets of object queries may be obtained from the clip-level segmenter 109. To further capture the global (i.e., whole-video) temporal connections, trajectory attention may be applied to all the clip-level object queries. Intuitively, since each object query is learned to encode one object in a clip, applying trajectory attention to all the object queries learns to track each object across different clips through finding its trajectory in the video. In addition to trajectory attention, the Temporal-ASPP may be used to capture object motion at different time spans. The resulting second sub-model 106 may iteratively stack trajectory attention and Temporal-ASPP to refine the object queries of a video, thereby obtaining a temporally consistent prediction at the video-level. The second sub-model 106 may enable the whole video to be received as input during inference, encouraging temporal consistency in a complete offline manner.

The first sub-model 102 and the second sub-model 106 enable to system 100 to achieve much better temporally consistent segmentation results than existing segmentation techniques. For example, the first sub-model 102 and the second sub-model 106 enable to system 100 to achieve much better temporally consistent segmentation by leveraging trajectory attention, which is typically used for the task of video classification. The trajectory attention leveraged by the system 100 may be adapted for processing both the dense pixel features and object queries, aiming to improve the within-clip and cross-clip tracking results, respectively.

The system 100, including the first sub-model 102 and the second sub-model 106, built on top of any clip-level video segmenter, may be used for inference of the whole video in an offline fashion by refining the clip-level prediction results. To obtain video-level tube from the refined object queries, a 1D convolution layer may be exploited to generate the temporal weighted class prediction motivated by the fact that the object queries on the trajectory path should have the same class prediction.

Figure 2:
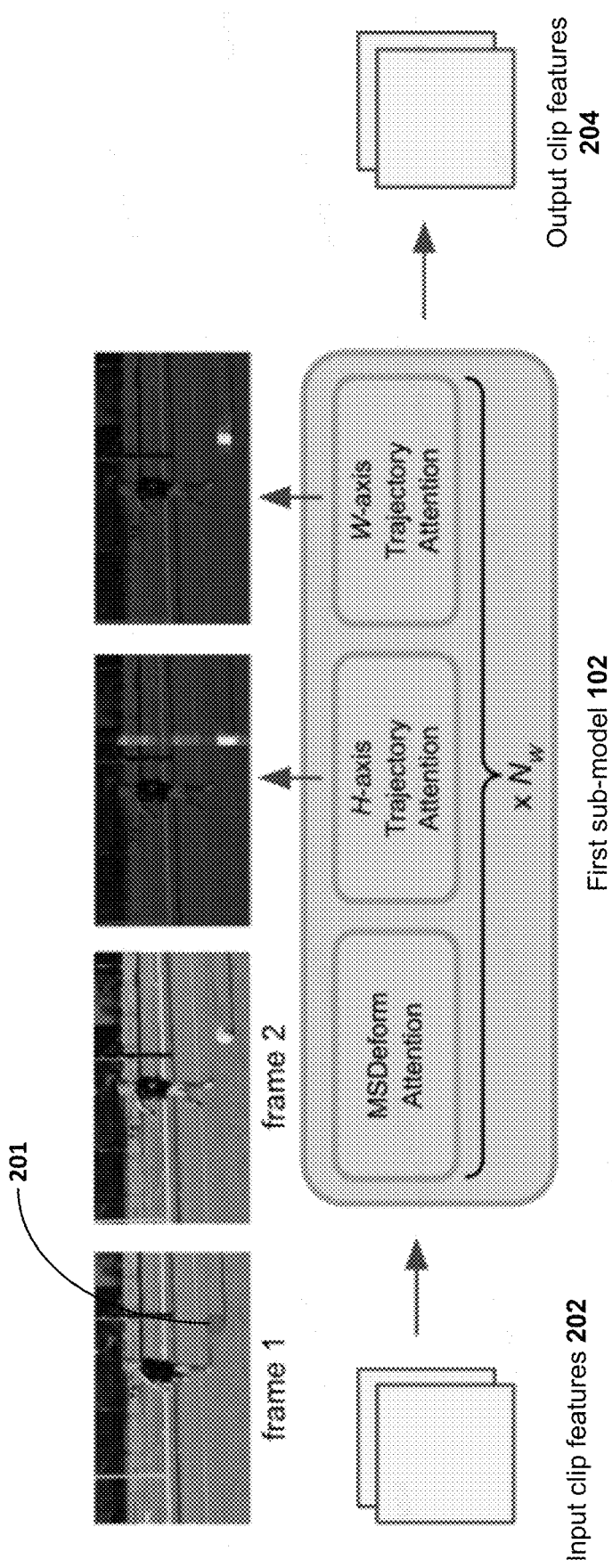
FIG. 2 shows an example first sub-model in accordance with the present disclosure.

FIG. 2 shows the first sub-model 102 (e.g., within-clip tracking sub-model) in more detail. The main component of the first sub-model 102 is the axial-trajectory attention. The axial-trajectory attention decomposes the trajectory attention in the height-axis and width-axis, and effectively learns to track objects across the frames in the same clip (e.g., within-clip tracking). The axial decomposition significantly reduces the computational complexity for dense pixel features.

In the first sub-model 102, the input features 202 may be enriched by exploiting the multi-scale deformable attention and axial-trajectory attention. The axial-trajectory attention deploys trajectory attention in a manner similar to axial-attention, which not only effectively captures object motion information but also reduces the computational cost. The attention may be visualized with respect to the reference point (e.g., dot) 201 shown in the frame 1. The first sub-model 102 iteratively stacks multi-scale deformable attention and axial-trajectory attention (sequentially along the height axis (H-axis) and the width axis (W-axis)) for $N_w$ times, and outputs the spatially and temporally consistent clip features 204.

Formally, an input video clip consisting of T frames may be forwarded through a frame-level network backbone (e.g., ConvNext) to extract the feature map $F \in \mathbb{R}^{T \times D \times H \times W}$ where D, H, W stand for the dimension, height and width of the feature map F, respectively. The feature map F may be extracted frame-by-frame via the network backbone, and thus no temporal information may be exchanged between frames. The feature 202 may be reshaped into $F_h \in \mathbb{R}^{W \times TH \times D}$ to obtain a sequence of TH pixel features $x_{th} \in \mathbb{R}^D$. $x_{th}$ may be linearly projected to a set of query-key-value vectors $q_{th}$, $k_{th}$, $v_{th} \in \mathbb{R}^D$. Axial-attention may be performed along trajectories (i.e., the probabilistic path of a point between frames). Specifically, for each reference point at a specific time-height th position and its corresponding query $q_{th}$, a set of trajectory points $\tilde{y}_{tt'h}$ may be constructed. The set of trajectory points may represent the pooled information weighted by the trajectory probability. The axial-trajectory extends for the duration of the video clip, and its point $\tilde{y}_{tt'h} \in \mathbb{R}^D$ at different times t' is defined as follows:

$$\tilde{y}_{t'h} = \sum_{h'} v_{t'h'} \cdot \frac{\exp\langle q_{th}, k_{t'h'}\rangle}{\sum_{\overline{h}} \exp\langle q_{th}, k_{t'\overline{h}}\rangle}.$$

This step computes the axial-trajectory attention in H-axis (index h'), independently for each frame. It finds the axial-trajectory path of the reference point th across frames t' in the clip by comparing the trajectory query $q_{th}$ to the keys $k_{t'h'}$, only along the H-axis. To reason about the intra-frame (in the same clip) connections, the trajectories may be pooled over time t'. Specifically, the trajectory points $\tilde{y}_{tt'h}$ may be linearly projected to obtain a new set of query-key-value vectors:

$$\tilde{q}_{th} = W_q \tilde{y}_{tth},$$
$$\tilde{k}_{t'h} = W_k \tilde{y}_{t'h},$$
$$\tilde{v}_{t'h} = W_v \tilde{y}_{t'h},$$

where $W_q$, $W_k$, and $W_v$ are the linear projection matrices for query, key, and value. The reference point at time-height th position may then be updated by applying 1D attention along the time t':

$$y_{th} = \sum_{t'} \tilde{v}_{t'h} \cdot \frac{\exp\langle \tilde{q}_{th}, \tilde{k}_{t'h}\rangle}{\sum_{\bar{t}} \exp\langle \tilde{q}_{th}, \tilde{k}_{\bar{t}h}\rangle}.$$

With the above update rules, the motion information may be propagated in the in H-axis in the video clip. To capture global information, the feature 202 may be further reshaped into $F_w \in \mathbb{R}^{H \times TW \times D}$ and the same axial-trajectory attention may be applied (but along the W-axis) consecutively to capture the width dynamics. The axial-trajectory attention effectively reduces the computational complexity of original trajectory attention from $\mathcal{O}(T^2H^2W^2)$ to $\mathcal{O}(T^2H^2W + T^2W^2H)$, allowing it to be applied to the dense video feature maps, and to reason about the motion information across frames in the same clip.

To enhance the features 202 spatially, a multi-scale deformable attention may be adopted for exchanging information at different levels of feature. Specifically, the multi-scale deformable attention may be applied to the feature map F (extracted by the network backbone) frame-by-frame, which effectively exchanges the information across feature map scales (stride 32, 16, and 8) for each frame. In the end, the first sub-model 102 may be obtained by iteratively stacking multi-scale deformable attention and the axial-trajectory attention to ensure the learned features 204 are spatially consistent across the scale and temporally consistent across the frames in the same clip.

In embodiments, the first sub-model 102 may enable the clip-level segmenter to segment the video in a near-online fashion (i.e., clip-by-clip). Unlike existing techniques, which take overlapping clips as input and use video stitching to link predicted clip-level tubes, the first sub-model 102 may uses Hungarian Matching to associate the clip-level tubes via the object queries (on the clip-level, instead of frame-level, since our input clips are non-overlapping).

Figure 3:
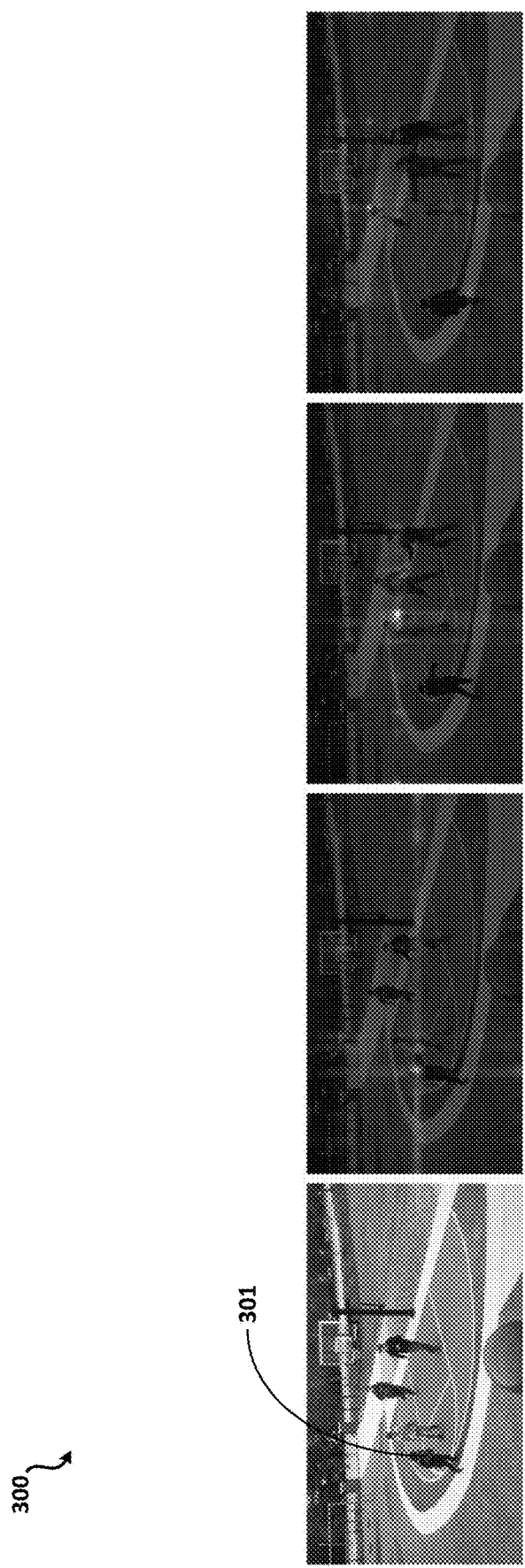
FIG. 3 shows an example visualization of learned axial-trajectory attention in accordance with the present disclosure.

FIG. 3 shows an example visualization 300 of learned axial-trajectory attention. In this short clip of four frames depicting the action "playing basketball," the basketball location at frame 1 is selected as the reference point 301. The axial-trajectory attention may be computed sequentially along the H-axis and W-axis. The H-axis and W-axis trajectory attentions may be multiplied to visualize the trajectory of the reference point 301 over time (i.e., a bright point corresponds a high attention value in both the H- and W-axis trajectory attention). As shown in FIG. 3, the learned axial-trajectory attention is able to capture the basketball's motion path.

Figure 4:
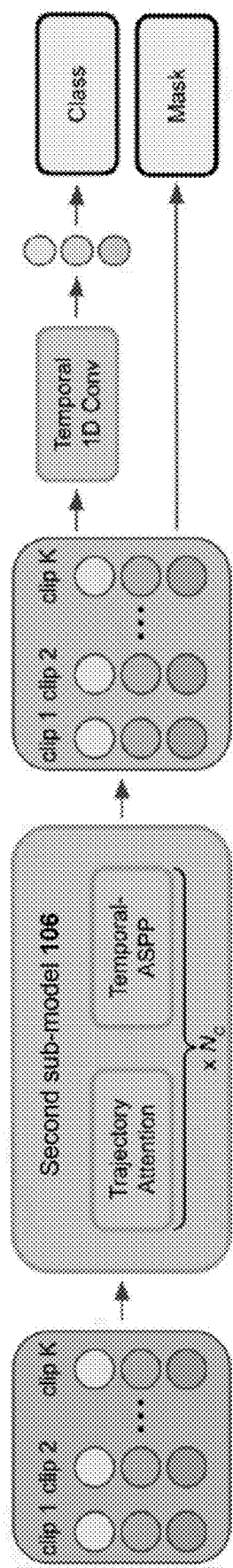
FIG. 4 shows an example second sub-model in accordance with the present disclosure.

FIG. 4 illustrates the second sub-model 106 in more detail. The second sub-model 106 may refine the K sets of clip object queries by iteratively performing trajectory attention and Temporal-ASPP for $N_c$ times. Though axial-trajectory attention along with the multi-scale deformable attention effectively improves the within-clip tracking ability to address the inconsistency between clips (i.e., beyond the clip length T) especially under the fast-moving or occluded scenes. The second sub-model 106 may address the inconsistency by refining and better associating the clip-level predictions. Concretely, given the object queries $\{C_k\}_{k-1}^K \in \mathbb{R}^{KN \times D}$ of a video (where the video is divided into K=L/T non-overlapping clips, and k-th clip has its own object queries $C_k \in \mathbb{R}^{N \times D}$), the Hungarian Matching may first be used to align the object queries as the initial tracking results. Then, the object queries may be used as the input to the second sub-model 106, which may further refine the tracking results to capture whole-video temporal connections (i.e., cross all clips). The second sub-model 106 contains two operations: trajectory-attention and Temporal-ASPP.

In embodiments, the second sub-model 106 contains the trajectory-attention operation. For k-th clip, the object queries $C_k$ encode the clip-level tube predictions (i.e., each query in $C_k$ generates the class-labeled tube for a certain object in k-th clip). Therefore, associating clip-level prediction results may be similar to finding the trajectory path of object queries in the whole video. Trajectory attention may also be used for capturing the whole-video temporal connections between clips. Formally, for a video divided into K clips (each clip is processed by N object queries), each object query $C_{kn} \in \{C_k\}$ is first projected into a set of query-key-value vectors $q_{kn}$, $k_{kn}$, $v_{kn} \in \mathbb{R}^D$. Then, a set of trajectory queries $\tilde{Z}_{kk'n}$ may be computed by calculating the probabilistic path of each object query:

$$\tilde{Z}_{kk'n} = \sum_{k'} v_{k'n'} \cdot \frac{\exp\langle q_{kn}, k_{k'n'}\rangle}{\sum_{\overline{n}} \exp\langle q_{kn}, k_{k'\overline{n}}\rangle}.$$

After further projecting the trajectory queries $\tilde{Z}_{kk'n}$ into $\tilde{q}_{kn}$, $\tilde{k}_{kk'n}$, $\tilde{v}_{kk'n}$ similarly to the equation for calculating the probabilistic path of each object query, the whole-video cross-clip connections may be aggregated along the trajectory path of object queries through:

$$Z_{kn} = \sum_{k'} v_{kk'n'} \cdot \frac{\exp\langle \tilde{q}_{kn}, \tilde{k}_{kk'n}\rangle}{\sum_{\overline{k}} \exp\langle \tilde{q}_{kn}, \tilde{k}_{k\overline{k}n}\rangle}.$$

In embodiments, the second sub-model 106 may contain the Temporal-ASPP operation. While the above trajectory attention reasons about the whole-video temporal connections, it can be further enriched by a short-term tracking module. The ASPP, which has been successful in capturing spatially multi-scale context information, may be extended to the temporal domain. Specifically, the Temporal-ASPP contains three parallel temporal atrous convolutions with different rates applied to the updated object queries Z for capturing object motion at different time spans.

In summary, video panoptic segmentation requires consistently segmenting (for both 'thing' and 'stuff' classes) and tracking objects in a video over time. The system 100 enriches an off-the-shelf mask transformer by leveraging trajectory attention. The deployed mask transformer takes as input a short clip consisting of only a few frames and predicts the clip-level segmentation. To enhance the temporal consistency, the system 100 employs within-clip and cross-clip tracking sub-models, efficiently utilizing trajectory attention.

The present disclosure adapts trajectory attention for both the dense pixel features and object queries, aiming to improve the short-term and long-term tracking results, respectively. Particularly, in the within-clip tracking sub-model, axial-trajectory attention that effectively computes the trajectory attention for tracking dense pixels sequentially along the height- and width-axes may be performed. The axial decomposition significantly reduces the computational complexity for dense pixel features. In the cross-clip tracking sub-model, since the object queries in mask transformer are learned to encode the object information, the long-term temporal connections are able to be captured by applying trajectory attention to object queries, which learns to track each object across different clips.

Figure 5:
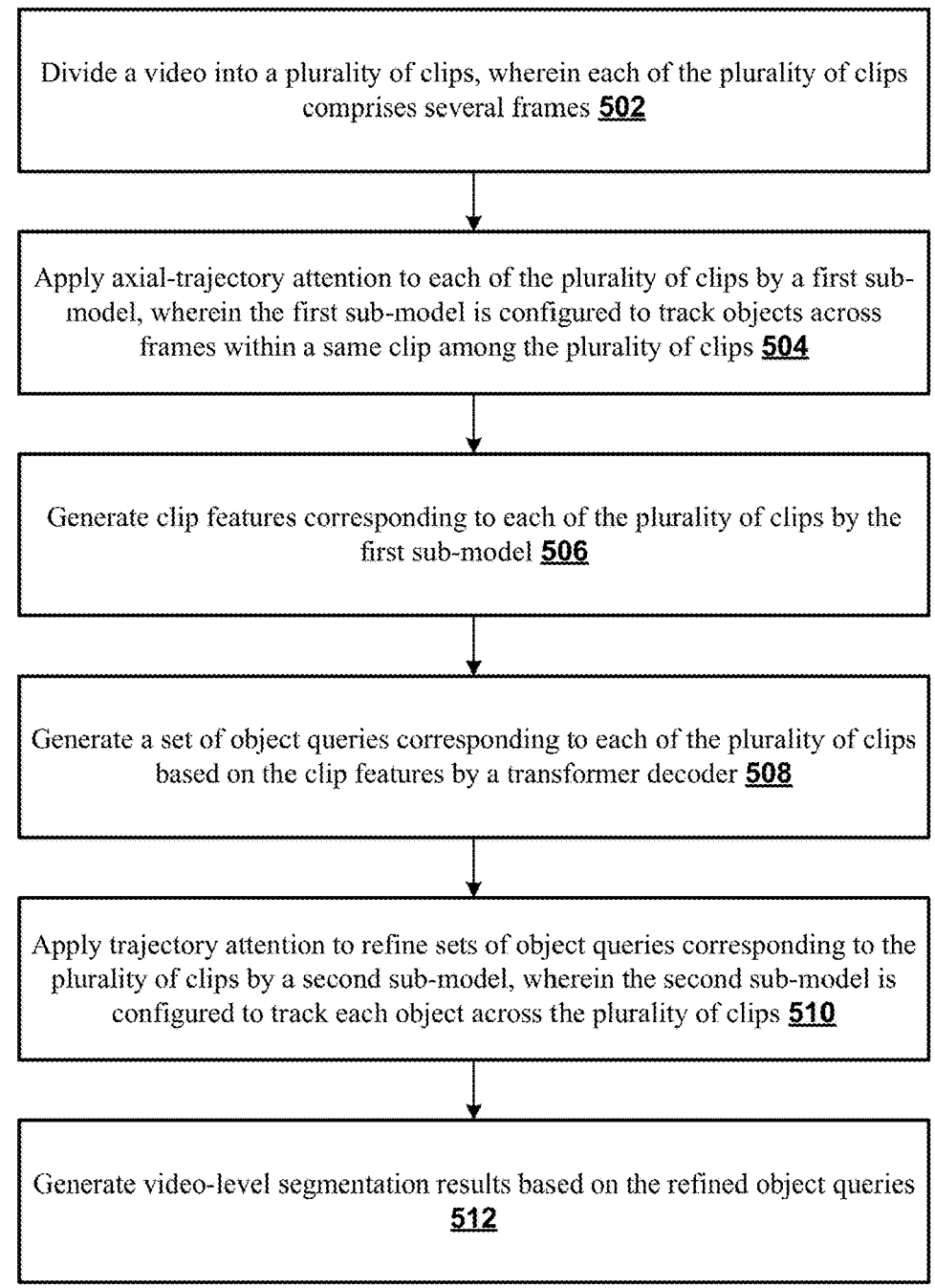
FIG. 5 shows an example process for implementing video segmentation in accordance with the present disclosure.

FIG. 5 illustrates an example process 500 for implementing video segmentation. Although depicted as a sequence of operations in FIG. 5, those of ordinary skill in the art will appreciate that various embodiments may add, remove, reorder, or modify the depicted operations.

At 502, a video may be divided into a plurality of clips. Each of the plurality of clips may comprises several frames of the video. For example, a whole video may be split into a set of non-overlapping clips. To enhance the local consistency within neighboring frames of a same clip, a first sub-model may apply axial-trajectory attention to each of the plurality of clips. At 504, axial-trajectory attention may be applied. The axial-trajectory attention may be applied to each of the plurality of clips by a first sub-model, e.g., the first sub-model 102 (i.e., within-clip tracking sub-model). The first sub-model may be configured to track objects across frames within a same clip among the plurality of clips. At 506, clip features may be generated. The clip features may correspond to each of the plurality of clips. The clip features may be generated by the first sub-model.

At 508, a set of object queries may be generated. The set of object queries may correspond to each of the plurality of clips. The set of object queries may be generated based on the clip features. The set of object queries may be generated by a transformer decoder. The transformer decoder may be a k-means transformer decoder configured to produce a clip-level prediction, where object queries are iteratively refined over multiple layers.

At 510, trajectory attention may be applied by a second sub-model, e.g., the second sub-model 106 (i.e., cross-clip tracking sub-model). The trajectory attention may be applied to refine sets of object queries corresponding to the plurality of clips. The trajectory attention may be applied by the second sub-model. The second sub-model may be configured to track each object across the plurality of clips. The second sub-model may improve long-term consistency using trajectory attention along with temporal atrous spatial pyramid pooling (Temporal-ASPP). At 512, video-level segmentation results may be generated. The video-level segmentation results may be generated based on the refined object queries. For example, a video-level segmenter may obtain video features by concatenating all clip features output by the first sub-model and generating a video prediction by multiplying ( ) the video features and the refined clip object queries.

Figure 6:
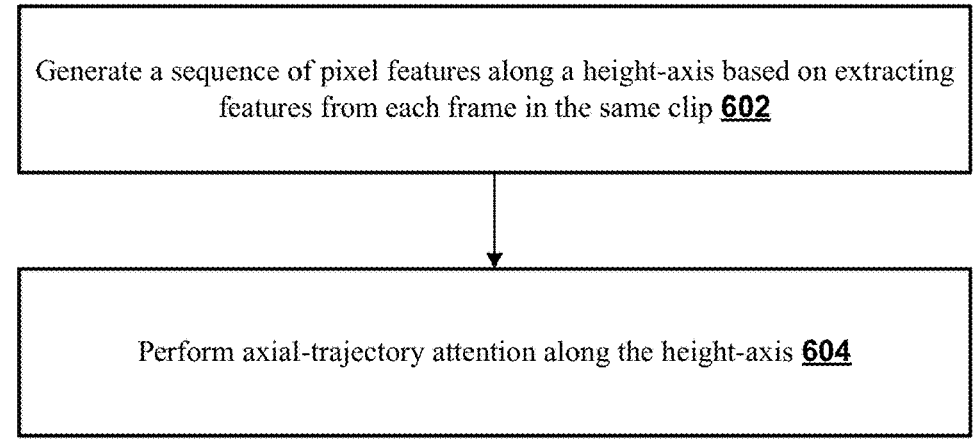
FIG. 6 shows an example process for implementing video segmentation in accordance with the present disclosure.

FIG. 6 illustrates an example process 600 for implementing video segmentation. Although depicted as a sequence of operations in FIG. 6, those of ordinary skill in the art will appreciate that various embodiments may add, remove, reorder, or modify the depicted operations.

A first sub-model (e.g., the first sub-model 102) may perform axial-trajectory attention that effectively computes the trajectory attention for tracking dense pixels sequentially along the height-axis. At 602, a sequence of pixel features may be generated. The sequence of pixel features may be generated along a height-axis. The sequence of pixel features may be generated based on extracting features from each of a plurality of frames in the same clip amongst a plurality of clips. At 604, axial-trajectory attention may be performed along the height-axis. The axial-trajectory attention may be performed by the first sub-model.

Figure 7:
FIG. 7 shows an example process for implementing video segmentation in accordance with the present disclosure.

FIG. 7 illustrates an example process 700 for implementing video segmentation. Although depicted as a sequence of operations in FIG. 7, those of ordinary skill in the art will appreciate that various embodiments may add, remove, reorder, or modify the depicted operations.

A first sub-model (e.g., the first sub-model 102) may perform axial-trajectory attention that effectively computes the trajectory attention for tracking dense pixels sequentially along the width-axis. At 702, a sequence of pixel features may be generated. The sequence of pixel features may be generated along a width-axis. The sequence of pixel features may be generated based on extracting features from each of a plurality of frames in the same clip amongst a plurality of clips. At 704, axial-trajectory attention may be performed along the width-axis. The axial-trajectory attention may be performed by the first sub-model.

FIG. 8 illustrates an example process 800 for implementing video segmentation. Although depicted as a sequence of operations in FIG. 8, those of ordinary skill in the art will appreciate that various embodiments may add, remove, reorder, or modify the depicted operations.

At 802, a video may be divided into a plurality of clips. Each of the plurality of clips may comprises several frames of the video. For example, a whole video may be split into a set of non-overlapping clips. Features corresponding to a particular clip may be input into a first sub-model (e.g., the first sub-model 102). The first sub-model may exploit axial-trajectory attention and multi-scale deformable attention for enhancing the local consistency within neighboring frames in a same clip. At 804, multi-scale deformable attention may be performed on feature maps extracted from frames in the same clip among the plurality of clips. The multi-scale deformable attention may be performed to exchange information across feature map scales and to ensure spatial consistency of clip features.

The multi-scale deformable attention may be stacked iteratively with the axial-trajectory attention. At 806, axial-trajectory attention may be applied. The axial-trajectory attention may be applied to each of the plurality of clips. The axial-trajectory attention may be applied to each of the plurality of clips along height-axis and width-axis. Applying the axial-trajectory attention may enhance the local consistency within neighboring frames of the same clip.

Figure 9:
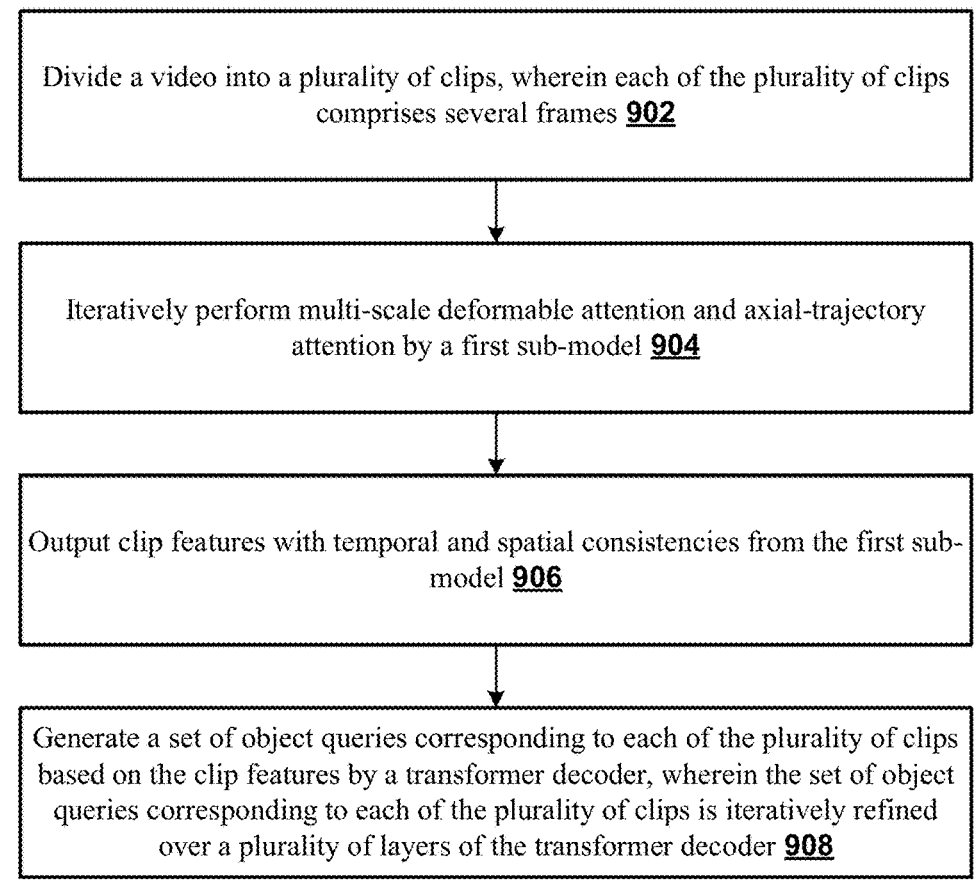
FIG. 9 shows an example process for implementing video segmentation in accordance with the present disclosure.

FIG. 9 illustrates an example process 900 for implementing video segmentation. Although depicted as a sequence of operations in FIG. 9, those of ordinary skill in the art will appreciate that various embodiments may add, remove, reorder, or modify the depicted operations.

At 902, a video may be divided into a plurality of clips. Each of the plurality of clips may comprises several frames of the video. For example, a whole video may be split into a set of non-overlapping clips. A first sub-model (e.g., the first sub-model 102) may be enhanced by incorporating multi-scale deformable attention, which may be stacked iteratively with the axial-trajectory attention to ensure that the learned clip features are both temporally and spatially consistent. At 904, multi-scale deformable attention and axial-trajectory attention may be iteratively performed. The multi-scale deformable attention and axial-trajectory attention may be iteratively performed by the first sub-model.

The first sub-model may output clip features (e.g., spatial-temporal enhanced features) for each of the plurality of clips. At 906, clip features with temporal and spatial consistencies may be output from the first sub-model. At 908, a set of object queries corresponding to each of the plurality of clips may be generated. The set of object queries may be generated based on the clip features by a transformer decoder. The set of object queries corresponding to each of the plurality of clips may be iteratively refined over a plurality of layers of a transformer decoder.

Figure 10:
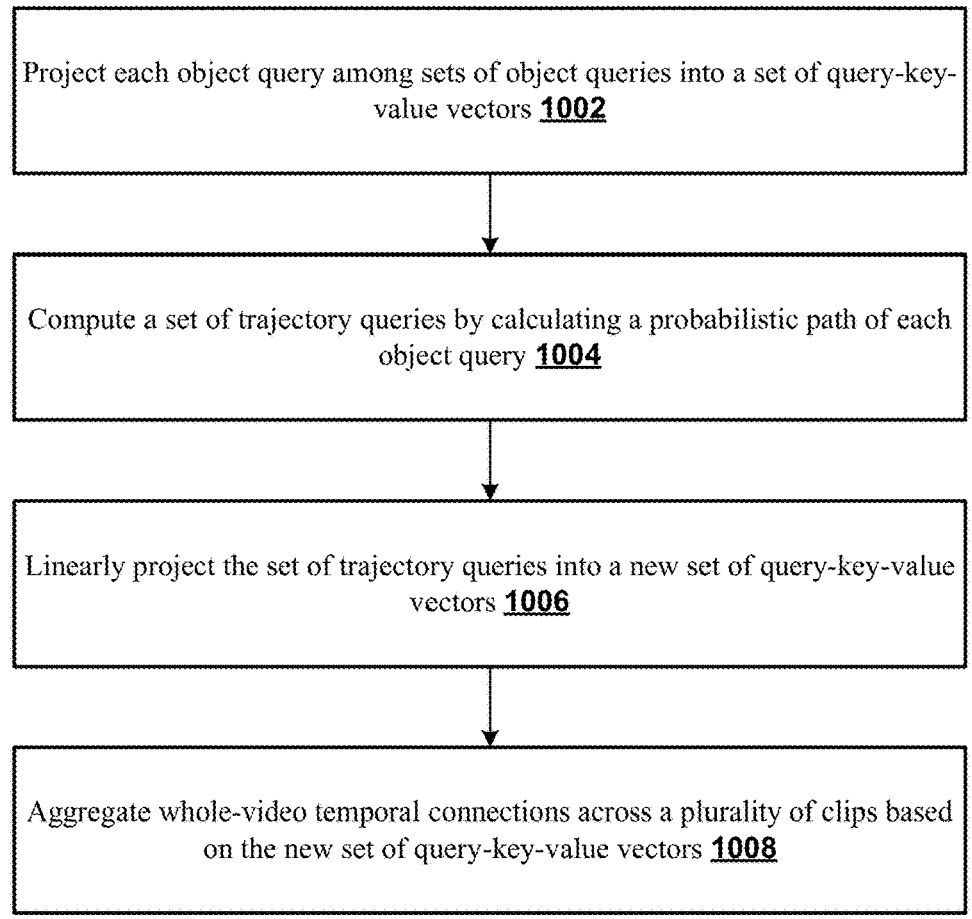
FIG. 10 shows an example process for implementing video segmentation in accordance with the present disclosure.

FIG. 10 illustrates an example process 1000 for implementing video segmentation. Although depicted as a sequence of operations in FIG. 10, those of ordinary skill in the art will appreciate that various embodiments may add, remove, reorder, or modify the depicted operations.

A second sub-model (e.g., the second sub-model 106) may perform a trajectory-attention operation. For k-th clip, the object queries $C_k$ encode the clip-level tube predictions (i.e., each query in $C_k$ generates the class-labeled tube for a certain object in k-th clip). Therefore, associating clip-level prediction results may be similar to finding the trajectory path of object queries in the whole video. Trajectory attention may also be used for capturing the whole-video temporal connections between clips. At 1002, each object query among sets of object queries may be projected into a set of query-key-value vectors. Formally, for a video divided into K clips (and each clip is processed by N object queries), each object query $C_{kn} \in \{C_k\}$ is first projected into a set of query-key-value vectors $q_{kn}, k_{kn}, v_{kn} \in \mathbb{R}^D$. At 1004, a set of trajectory queries may be computed. For example, the set of trajectory queries $\tilde{Z}_{kk'n}$ may be computed by calculating the probabilistic path of each object query:

$$\tilde{Z}_{kk'n} = \sum_{k'} v_{k'n'} \cdot \frac{\exp\langle q_{kn}, k_{k'n'}\rangle}{\sum_{\overline{n}} \exp\langle q_{kn}, k_{k'\overline{n}}\rangle}.$$

At 1006, the set of trajectory queries may be linearly projected into a new set of query-key-value vectors. After further projecting the trajectory queries $\tilde{Z}_{kk'n}$ into $\tilde{q}_{kn}, \tilde{k}_{kk'n}, \tilde{v}_{kk'n}$ similarly to the equation for calculating the probabilistic path of each object query, the whole-video cross-clip connections may be aggregated along the trajectory path of object queries. At 1008, whole-video temporal connections across a plurality of clips may be aggregated based on the new set of query-key-value vectors. For example, the whole-video cross-clip connections may be aggregated along the trajectory path of object queries through:

$$Z_{kn} = \sum_{k'} v_{kk'n'} \cdot \frac{\exp\langle \tilde{q}_{kn}, \tilde{k}_{kk'n}\rangle}{\sum_{\overline{k}} \exp\langle \tilde{q}_{kn}, \tilde{k}_{kk\overline{n}}\rangle}.$$

Figure 11:
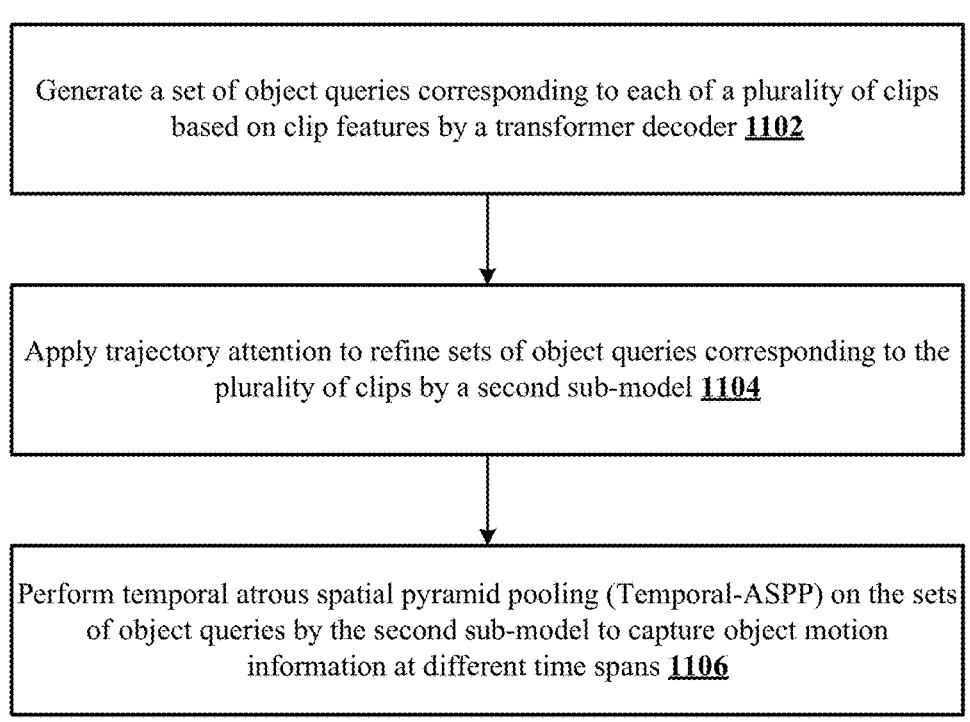
FIG. 11 shows an example process for implementing video segmentation in accordance with the present disclosure.

FIG. 11 illustrates an example process 1100 for implementing video segmentation. Although depicted as a sequence of operations in FIG. 11, those of ordinary skill in the art will appreciate that various embodiments may add, remove, reorder, or modify the depicted operations.

At 1102, a set of object queries may be generated. The set of object queries may correspond to each of the plurality of clips. The set of object queries may be generated based on the clip features. The set of object queries may be generated by a transformer decoder. The transformer decoder may be a k-means transformer decoder configured to produce a clip-level prediction, where object queries are iteratively refined over multiple layers.

At 1104, trajectory attention may be applied. The trajectory attention may be applied to refine sets of object queries corresponding to the plurality of clips. The trajectory attention may be applied by a second sub-model (e.g., the second sub-model 106). The second sub-model may be configured to track each object across the plurality of clips. The second sub-model may improve long-term consistency using trajectory attention along with temporal atrous spatial pyramid pooling (Temporal-ASPP). At 1106, Temporal-ASPP may be performed on the sets of object queries. Temporal-ASPP may be performed on the sets of object queries to capture object motion information at different time spans.

Figure 12:
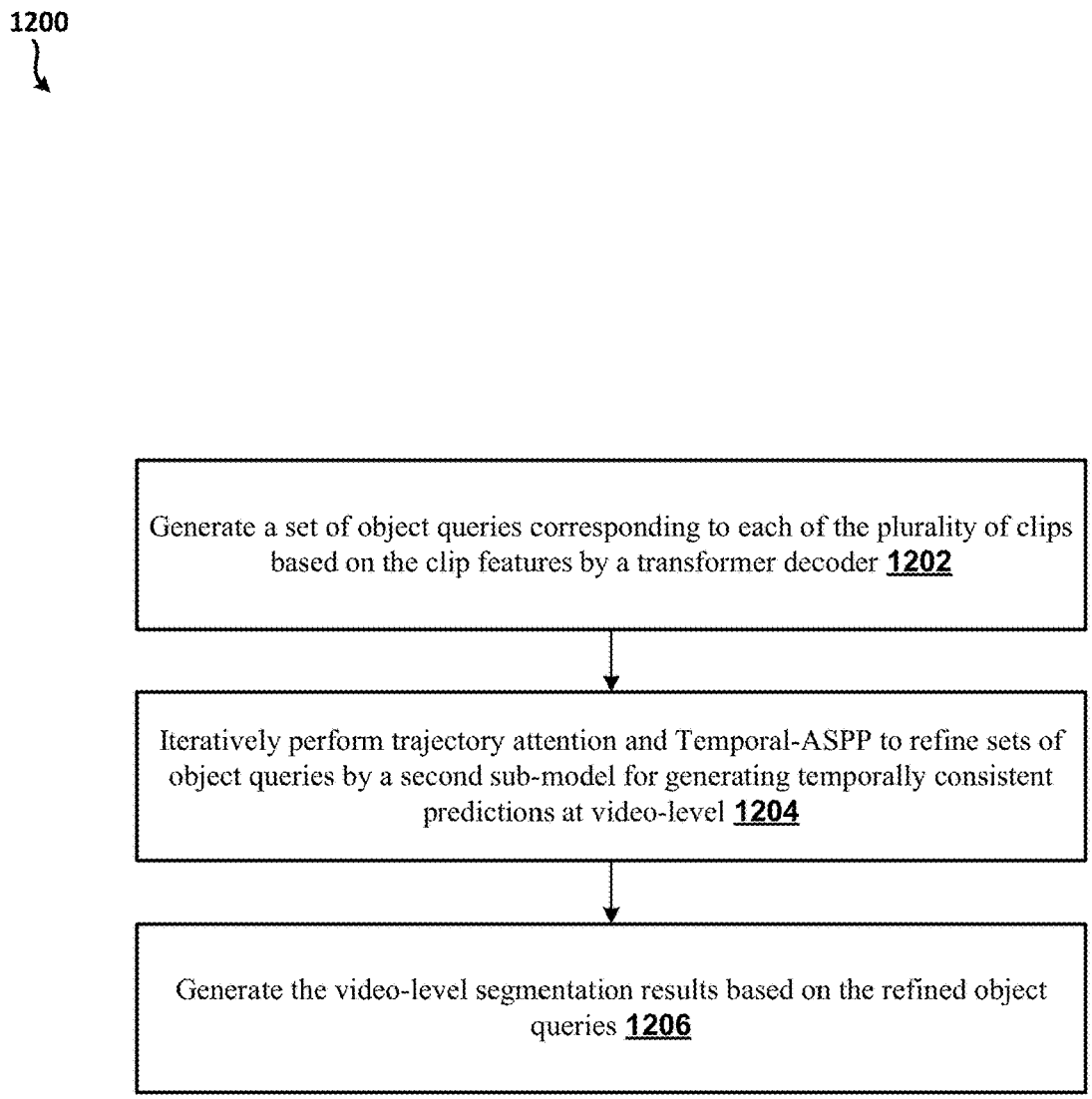
FIG. 12 shows an example process for implementing video segmentation in accordance with the present disclosure.

FIG. 12 illustrates an example process 1200 for implementing video segmentation. Although depicted as a sequence of operations in FIG. 12, those of ordinary skill in the art will appreciate that various embodiments may add, remove, reorder, or modify the depicted operations.

At 1202, a set of object queries may be generated. The set of object queries may correspond to each of the plurality of clips. The set of object queries may be generated based on the clip features. The set of object queries may be generated by a transformer decoder. The transformer decoder may be a k-means transformer decoder configured to produce a clip-level prediction, where object queries are iteratively refined over multiple layers.

To further capture the global (i.e., whole-video) temporal connections, trajectory attention may be applied to all the clip-level object queries. Intuitively, since each object query is learned to encode one object in a clip, applying trajectory attention to all the object queries learns to track each object across different clips through finding its trajectory in the video. In addition to trajectory attention, the Temporal-ASPP may be used to capture object motion at different time spans. The resulting second sub-model may iteratively stack trajectory attention and Temporal-ASPP to refine the object queries of a video, thereby obtaining a temporally consistent prediction at the video-level.

At 1204, trajectory attention and Temporal-ASPP may be iteratively performed. Trajectory attention and Temporal-ASPP may be iteratively performed to refine sets of object queries. The trajectory attention and Temporal-ASPP may be iteratively performed for generating temporally consistent predictions at video-level. The second sub-model may enable the whole video to be received as input during inference, encouraging temporal consistency in a complete offline manner.

At 1206, video-level segmentation results may be generated. The video-level segmentation results may be generated based on the refined object queries. For example, a video-level segmenter may obtain video features by concatenating all clip features output by a first sub-model and generating a video prediction by multiplying ($\otimes$) the video features and the refined clip object queries.

The system 100 is a unified approach for both near-online and offline video segmentation (i.e., the cross-clip tracking sub-model is only used for the offline setting). For the near-online setting (i.e., employing the within-clip tracking sub-model), a clip size of two may be used. For the offline setting (i.e., employing the cross-clip tracking sub-model), a video length of 24 (i.e., 12 clips) may be used. In embodiments, only the first sub-model 102 may be trained, while both the clip-level segmenter and the second sub-model 106 are frozen due to memory constraint. During testing, the whole video may be directly inferenced with the full model.

Ablations studies were conducted on a VIPSeg dataset, using ResNet50. VIPSeg is a new large-scale video panoptic segmentation dataset, targeting for diverse in-the-wild scenes. The dataset contains 124 semantic classes (58 "thing" and 66 "stuff" classes) with 3536 videos, where each video spans 3 to 10 seconds. The main adopted evaluation metric is VPQ (video panoptic quality) on this benchmark.

FIG. 13 shows a table 1300 illustrating the results of the ablation on the within-clip tracking sub-model. The number of Multi-Scale Deformable Attention (#MSDeformAttn), the number of Trajectory Attention (#TrjAttn), and/or the number of Axial-Trajectory Attention (#AxialTrjAttn) were varied. $N_w$ detnotes the number of blocks (i.e., repetitions). First, one MSDeformAttn (Multi-Scale Deformable Attention) and one TrjAttn (Trajectory Attention) with $N_w=2$ (i.e., stacking two blocks of them) were employed, obtaining a performance of 45.3% VPQ. Replacing the TrjAttn with the proposed Axial TrjAttn (Axial Trajectory Attention, sequentially along H- and W-axes) yields a comparable performance of 45.4%. Stacking two Axial TrjAttn layers in each block leads to the final setting with performance of 46.1%. It may be Out-Of-Memory, if two TrjAttn layers are stacked in a V100 GPU. Increasing or decreasing the number of blocks $N_w$ degrades the performance slightly. If one more AxialTrjAttn layers are employed per block, the performance drops by 0.4%. Finally, if the iterative stacking scheme is changed to a sequential manner (i.e., stacking two MSDeformAttn, followed by four AxialTrjAttn), the performance also decreases slightly by 0.3%.

Figure 14:
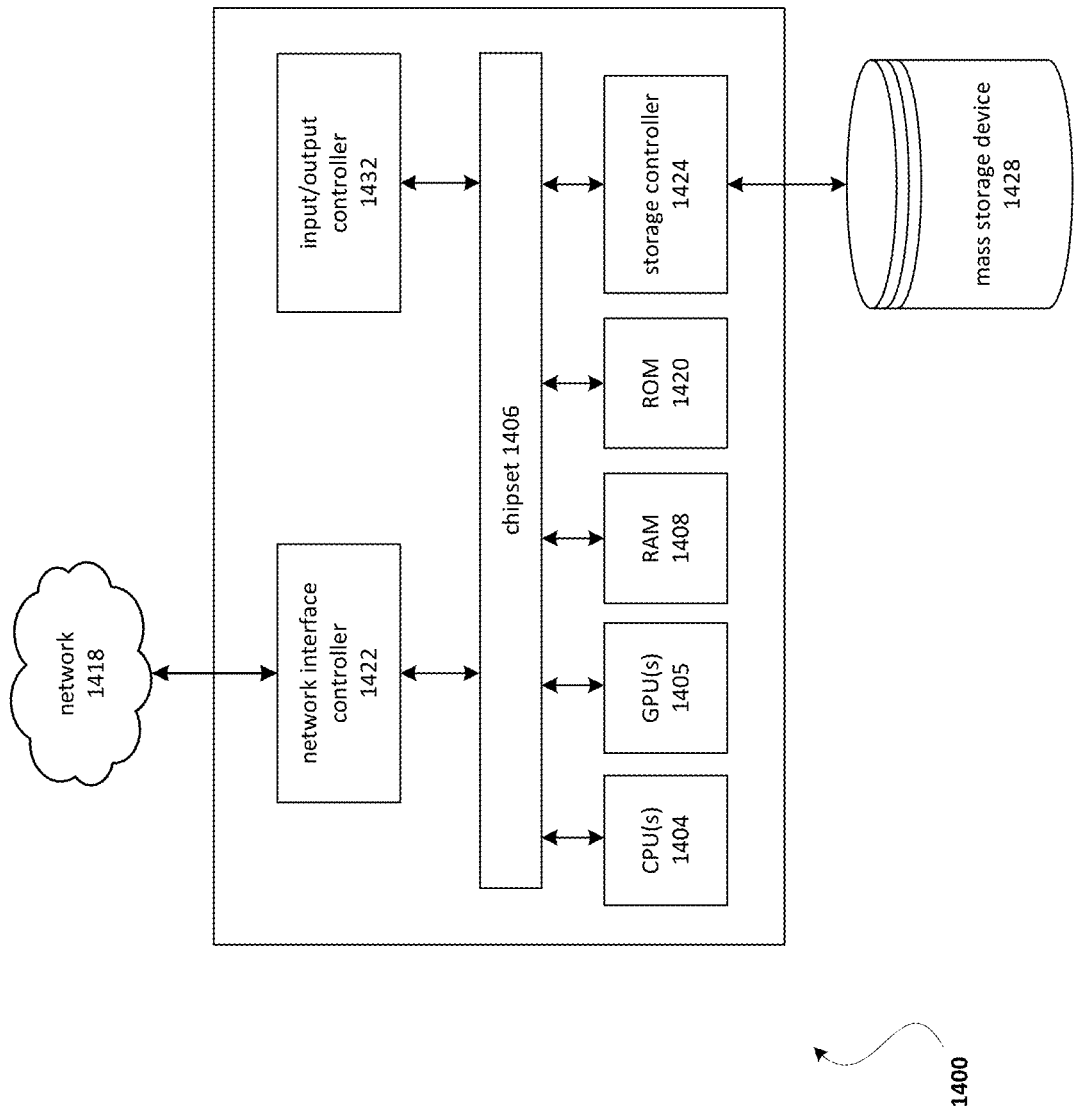
FIG. 14 shows an example computing device which may be used to perform any of the techniques disclosed herein.

FIG. 14 illustrates a computing device that may be used in various aspects, such as the services, networks, sub-models, and/or devices depicted in any of FIGS. 1-4. With regard to FIGS. 1-4, any or all of the components may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of implementing video segmentation, comprising:
dividing a video into a plurality of clips, wherein each of the plurality of clips comprises several frames;
applying axial-trajectory attention to each of the plurality of clips by a first sub-model, wherein the first sub-model is configured to track objects across frames within a same clip among the plurality of clips;
generating clip features corresponding to each of the plurality of clips by the first sub-model;
generating a set of object queries corresponding to each of the plurality of clips based on the clip features by a transformer decoder;

applying trajectory attention to refine sets of object queries corresponding to the plurality of clips by a second sub-model, wherein the second sub-model is configured to track each object across the plurality of clips; and generating video-level segmentation results based on the refined object queries.

2. The method of claim 1, further comprising:

generating a sequence of pixel features along a height-axis based on extracting features from each frame in the same clip; and performing the axial-trajectory attention along the height-axis.

3. The method of claim 1, further comprising:

generating a sequence of pixel features along a width-axis based on extracting features from each frame in the same clip; and performing the axial-trajectory attention along the width-axis.

4. The method of claim 1, further comprising:

performing multi-scale deformable attention on feature maps extracted from frames in the same clip to exchange information across feature map scales and to ensure spatial consistency of the clip features.

5. The method of claim 4, further comprising:

iteratively performing the multi-scale deformable attention and the axial-trajectory attention by the first sub-model; and outputting the clip features with temporal and spatial consistencies from the first sub-model.

6. The method of claim 1, wherein the set of object queries corresponding to each of the plurality of clips is iteratively refined over a plurality of layers of the transformer decoder.

7. The method of claim 1, wherein the applying trajectory attention to refine sets of object queries corresponding to the plurality of clips by a second sub-model further comprises:

projecting each object query among the sets of object queries into a set of query-key-value vectors;

computing a set of trajectory queries by calculating a probabilistic path of each object query;

linearly projecting the set of trajectory queries into a new set of query-key-value vectors; and aggregating whole-video temporal connections across the plurality of clips based on the new set of query-key-value vectors.

8. The method of claim 1, further comprising:

performing temporal atrous spatial pyramid pooling (Temporal-ASPP) on the sets of object queries to capture object motion information at different time spans.

9. The method of claim 8, further comprising:

iteratively performing the trajectory attention and the Temporal-ASPP to refine the sets of object queries by the second sub-model for generating temporally consistent predictions at the video-level.

10. A system of implementing video segmentation, comprising:

at least one processor; and at least one memory communicatively coupled to the at least one processor and comprising computer-readable instructions that upon execution by the at least one processor cause the at least one processor to perform operations comprising:

dividing a video into a plurality of clips, wherein each of the plurality of clips comprises several frames;

applying axial-trajectory attention to each of the plurality of clips by a first sub-model, wherein the first sub-model is configured to track objects across frames within a same clip among the plurality of clips;

generating clip features corresponding to each of the plurality of clips by the first sub-model;

generating a set of object queries corresponding to each of the plurality of clips based on the clip features by a transformer decoder;

applying trajectory attention to refine sets of object queries corresponding to the plurality of clips by a second sub-model, wherein the second sub-model is configured to track each object across the plurality of clips; and generating video-level segmentation results based on the refined object queries.

11. The system of claim 10, the operations further comprising:

generating a sequence of pixel features along a height-axis based on extracting features from each frame in the same clip; and performing the axial-trajectory attention along the height-axis.

12. The system of claim 10, the operations further comprising:

generating a sequence of pixel features along a width-axis based on extracting features from each frame in the same clip; and performing the axial-trajectory attention along the width-axis.

13. The system of claim 10, the operations further comprising:

performing multi-scale deformable attention on feature maps extracted from frames in the same clip to exchange information across feature map scales and to ensure spatial consistency of the clip features.

14. The system of claim 10, wherein the applying trajectory attention to refine sets of object queries corresponding to the plurality of clips by a second sub-model further comprises:

projecting each object query among the sets of object queries into a set of query-key-value vectors;

computing a set of trajectory queries by calculating a probabilistic path of each object query;

linearly projecting the set of trajectory queries into a new set of query-key-value vectors; and aggregating whole-video temporal connections across the plurality of clips based on the new set of query-key-value vectors.

15. The system of claim 10, the operations further comprising:

performing temporal atrous spatial pyramid pooling (Temporal-ASPP) on the sets of object queries to capture object motion information at different time spans.

16. A non-transitory computer-readable storage medium, storing computer-readable instructions that upon execution by a processor cause the processor to implement operations comprising:

dividing a video into a plurality of clips, wherein each of the plurality of clips comprises several frames;

applying axial-trajectory attention to each of the plurality of clips by a first sub-model, wherein the first sub-model is configured to track objects across frames within a same clip among the plurality of clips;

generating clip features corresponding to each of the plurality of clips by the first sub-model;

generating a set of object queries corresponding to each of the plurality of clips based on the clip features by a transformer decoder;

applying trajectory attention to refine sets of object queries corresponding to the plurality of clips by a second sub-model, wherein the second sub-model is configured to track each object across the plurality of clips; and generating video-level segmentation results based on the refined object queries.

17. The non-transitory computer-readable storage medium of claim 16, the operations further comprising:

generating a sequence of pixel features along a height-axis based on extracting features from each frame in the same clip; and performing the axial-trajectory attention along the height-axis.

18. The non-transitory computer-readable storage medium of claim 16, the operations further comprising:

generating a sequence of pixel features along a width-axis based on extracting features from each frame in the same clip; and performing the axial-trajectory attention along the width-axis.

19. The non-transitory computer-readable storage medium of claim 16, the operations further comprising:

performing multi-scale deformable attention on feature maps extracted from frames in the same clip to exchange information across feature map scales and to ensure spatial consistency of the clip features.

20. The non-transitory computer-readable storage medium of claim 16, the operations further comprising:

performing temporal atrous spatial pyramid pooling (Temporal-ASPP) on the sets of object queries to capture object motion information at different time spans.

* * * * *